United States Patent
Haaf

(10) Patent No.: US 8,336,501 B2
(45) Date of Patent: Dec. 25, 2012

(54) CAT GROOMING AND ACTIVITY DEVICE

(75) Inventor: David Haaf, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 32 days.

(21) Appl. No.: 13/015,405

(22) Filed: Jan. 27, 2011

(65) Prior Publication Data

US 2012/0192803 A1 Aug. 2, 2012

(51) Int. Cl.
*A01K 29/00* (2006.01)
(52) U.S. Cl. .................................................. 119/621
(58) Field of Classification Search .......... 119/621, 119/706, 702; *A01K 13/00*
See application file for complete search history.

(56) References Cited

U.S. PATENT DOCUMENTS

| | | | |
|---|---|---|---|
| 2,894,487 A | 7/1969 | Goldson | |
| D235,270 S | 6/1975 | Borak | |
| 4,177,763 A * | 12/1979 | Cook | 119/706 |
| 4,747,371 A * | 5/1988 | Leopold | 119/602 |
| 4,926,796 A * | 5/1990 | Leopold | 119/602 |
| 5,517,945 A | 5/1996 | Udelle | |
| 5,680,831 A | 10/1997 | Udelle | |
| D386,839 S * | 11/1997 | Jennus | D30/160 |
| 5,842,440 A * | 12/1998 | Bell, Jr. | 119/621 |
| D444,600 S | 7/2001 | Spritzer | |
| 6,345,593 B1 | 2/2002 | Stewart et al. | |
| 6,378,462 B1 * | 4/2002 | Gaves et al. | 119/621 |
| 6,490,996 B1 | 12/2002 | Terry | |
| 6,619,237 B2 | 9/2003 | Robertson | |
| 6,666,167 B1 * | 12/2003 | Carlson | 119/54 |
| 7,444,959 B2 | 11/2008 | Hensley | |
| D614,364 S | 4/2010 | Kellogg et al. | |
| 7,765,956 B2 | 8/2010 | Lamstein | |
| 2003/0209209 A1 * | 11/2003 | Udelle et al. | 119/609 |
| 2007/0039558 A1 * | 2/2007 | Hensley | 119/621 |
| 2008/0190377 A1 * | 8/2008 | Clowder | 119/706 |
| 2009/0165731 A1 * | 7/2009 | Garry et al. | 119/621 |
| 2010/0319629 A1 * | 12/2010 | Kellogg et al. | 119/706 |
| 2010/0326367 A1 * | 12/2010 | Wedertz | 119/706 |

* cited by examiner

*Primary Examiner* — Richard Price, Jr.
(74) *Attorney, Agent, or Firm* — Bay Area Technology Law Group PC

(57) ABSTRACT

A cat grooming and activity device. The device includes a base configured to reside upon a substantially horizontal surface and to support a grooming activity post extending vertically from it. A grooming activity post is appended to and extends from the base, the grooming activity post having a first segment proximate the base and a second segment extending from the first segment. The first segment comprises a grooming surface and the second segment comprises a scratching surface.

9 Claims, 4 Drawing Sheets

CAT GROOMING AND ACTIVITY DEVICE

TECHNICAL FIELD

The present invention involves a cat grooming and activity device primarily intended to groom a domestic cat and provide entertainment as well as a surface enabling a cat to carry out its inherent need to scratch.

BACKGROUND OF THE INVENTION

It is quite important for the health and well being of a pet cat to provide stimulating activities and proper grooming. Cats which become bored often times become destructive not only of their surroundings but also of themselves. Cats which are not appropriately stimulated can actually suffer adverse health effects and, as such, proper pet stimulation should be of significance for all cat owners.

In addition to pet stimulation, generally, pet cats require rather unique amusement devices not shared by other domestic animals. Specifically, cats require, among other things, surfaces upon which they can scratch. If an appropriate cat scratching surface is not provided, cats will use any available surfaces including upholstered furniture, drapes and rugs to satisfy their need to scratch which could cause significant damage.

Cats further require appropriate grooming for their health and well being. Often times, cats try to clean themselves spending a good deal of time licking their fur and paws However, external grooming is also highly recommended as grooming accomplishes much more than providing a healthy coat. It also stimulates circulation, removes loose hair and helps prevent matting.

There are many cat scratcher devices in the marketplace as well as brushes and other grooming implements from which a cat owner can choose. However, by combining a grooming surface with a cat scratching surface as suggested herein, a synergy is created prompting self grooming as the cat seeks stimulation through attractants and interaction with a scratching medium.

It is thus an object of the present invention to provide a unitary grooming and cat scratching device which will promote the health and well being of a pet cat It is a further object of the present invention to provide a relatively inexpensive and easy to maintain combination grooming and cat scratching device which accomplishes the results sought herein and yet does so with a simple and inexpensive assembly.

These and further objects will be more readily appreciated when considering the following disclosure and appended claims.

SUMMARY OF THE INVENTION

A cat grooming and activity device. The device includes a base configured to reside upon a substantially horizontal surface and to support a grooming activity post extending vertically from it. A grooming activity post is appended to and extends from the base, the grooming activity post having a fast segment proximate the base and a second segment extending from the first segment. The first segment comprises a grooming surface and the second segment comprises a scratching surface.

DETAILED DESCRIPTION OF THE INVENTION

Figure 1A:
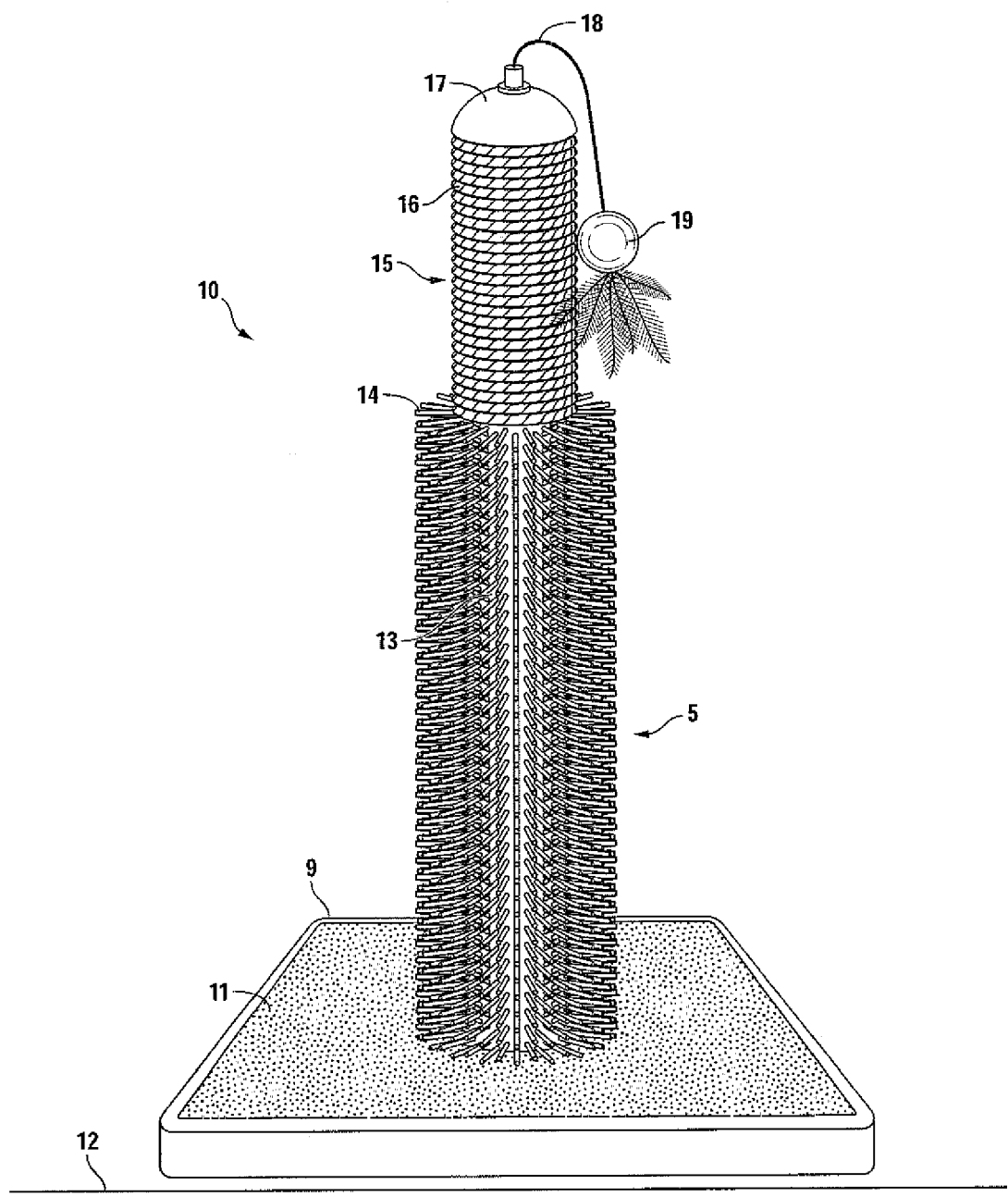
FIG. 1A is a perspective view of the cat grooming and activity device constituting the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figure 1B:
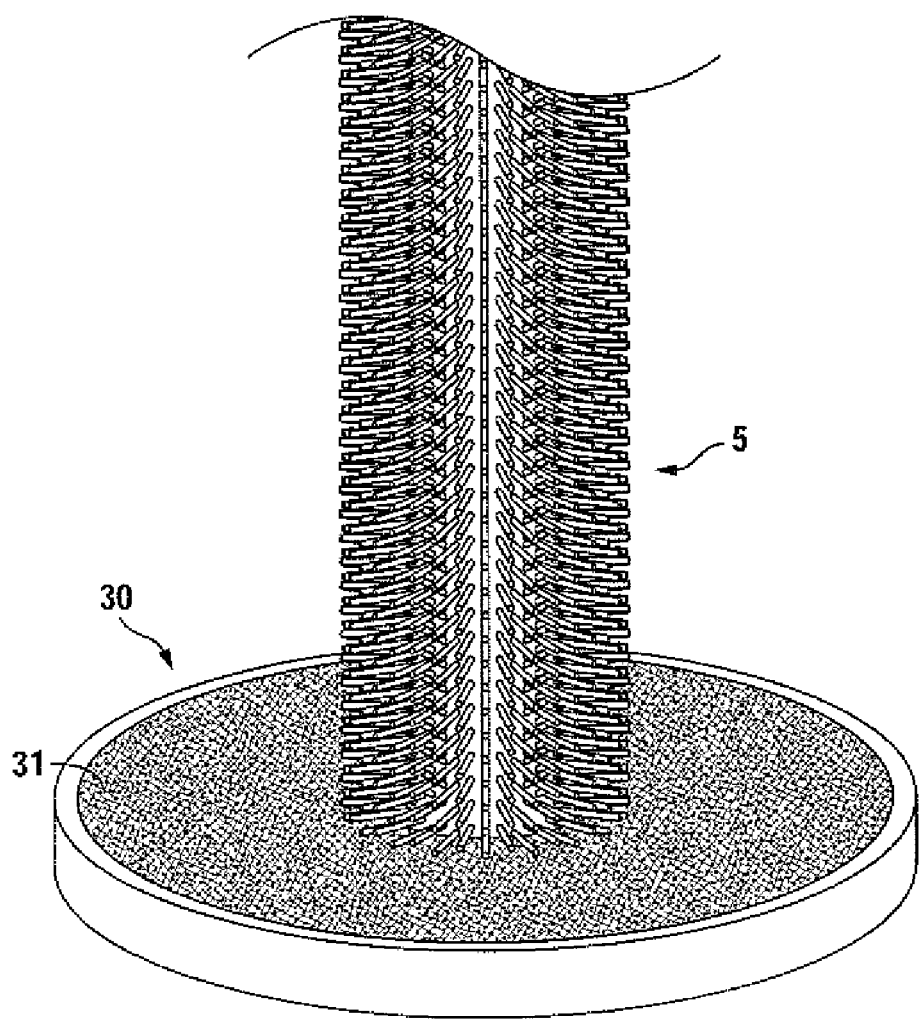
FIG. 1B is a perspective view of the lower portion of a cat grooming and activity device similar to that of FIG. 1A, illustrating a different base geometry.

To appreciate the present invention, reference is first made to FIG. 1A. In this regard, cat grooming and activity device 10 is shown having square or rectangular base 11 configured to reside upon substantially horizontal surface 12 which, in turn, supports grooming activity post 5 extending vertically therefrom. Alternatively base 30 can be of a circular geometry as shown in FIG. 1B.

Although not shown, it is recognized that grooming activity post 5 can be appended to bases 9 or 30 in any common fashion such as by providing a threaded bolt from the underside of the base passing therethrough and mating with a threaded receiving port located within the geometric center and along the longitudinal axis of grooming activity post 5.

Grooming activity post 5 is generally configured as having two distinct segments, namely, the lower segment having a grooming surface 13 from which pliable nodules 14 extend. Although pliable nodules 14 can take on a number various configurations composed of numerous materials, it was found most effective to provide grooming surface 13 with rubber or rubber-like cylindrically shaped elements which are a sufficient length to penetrate a cat's fur and yet be soft and pliable enough so as not to abrade the cat's skin for it to do so may encourage a cat to avoid the cat grooming and activity device, generally. Thermoplastic resin is an ideal material having nodules in the form of nubs consistent in size, shape and diameter and durometer.

Atop grooming surface 13 is located scratching surface 15. As noted previously, cats have an inherent need to scratch and cat products in the form of scratchers are well represented in the pet toy and amusement field It is common that such scratchers be composed of, for example, carpet, sisal, seagrass, cardboard and rope. In this instance, rope strand 16 is helically wound around a supporting cylindrical surface although, again, any other well known cat scratching medium can be substituted fox rope 16 while remaining within the spirit and scope of the present invention.

Figure 1C:
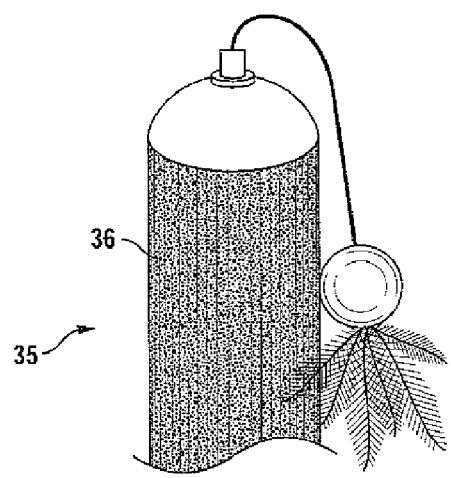
FIGS. 1C, 1D and 1E are perspective views of the upper portions of a cat grooming and activity device of the present invention illustrating carpet or sisal, cardboard and seagrass surfaces, respectively.
Figure 1D:
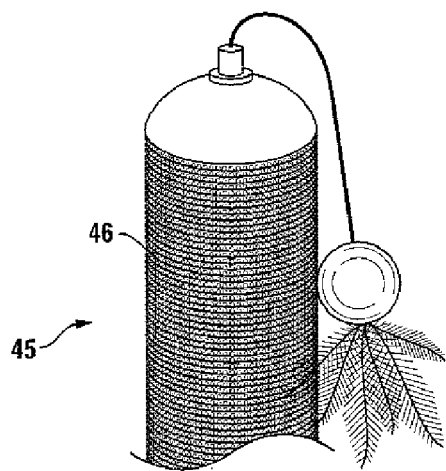
Figure 1E:
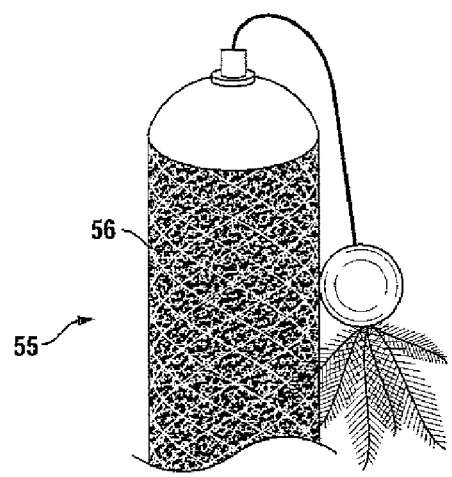

Other materials can be used as scratching surfaces as well. Notably, FIG. 1C illustrates scratching element 35 having carpet or sisal surface 36, FIG. 1D illustrates scratching element 45 having cardboard surface 46 and FIG. 1E illustrates scratching element 55 having seagrass surface 56.

Optionally, grooming activity post 5 can be topped with rounded end cap 17 from which umbilical 18 and cat attractant toy 19 can extend.

Although there are a number of commercially available products in the form of groomers and scratchers, the geometry and arrangement of parts makes the present cat grooming and activity device 10 truly unique. Although cats exhibit a natural tendency to scratch, and to rub themselves on trees and corners and the like, they do not exhibit the same need when it comes to grooming. Often times, a cat will self groom by licking and scratching its fur but will not voluntarily engage the surface of a grooming device unless encouraged to do so. With the present invention in mind, a pet cat stimulated by scratching surface 15 and optional pet toy 19 would inadvertently rub up against and otherwise engage grooming surface 13 and pliable nodules 14. Thus, as the cat is swatting at toy 19 and scratching at surface 16, it will be rubbing against grooming surface 13 and thus engaging in grooming as an adjunct to the overall scratching and swatting experience.

Figure 2:
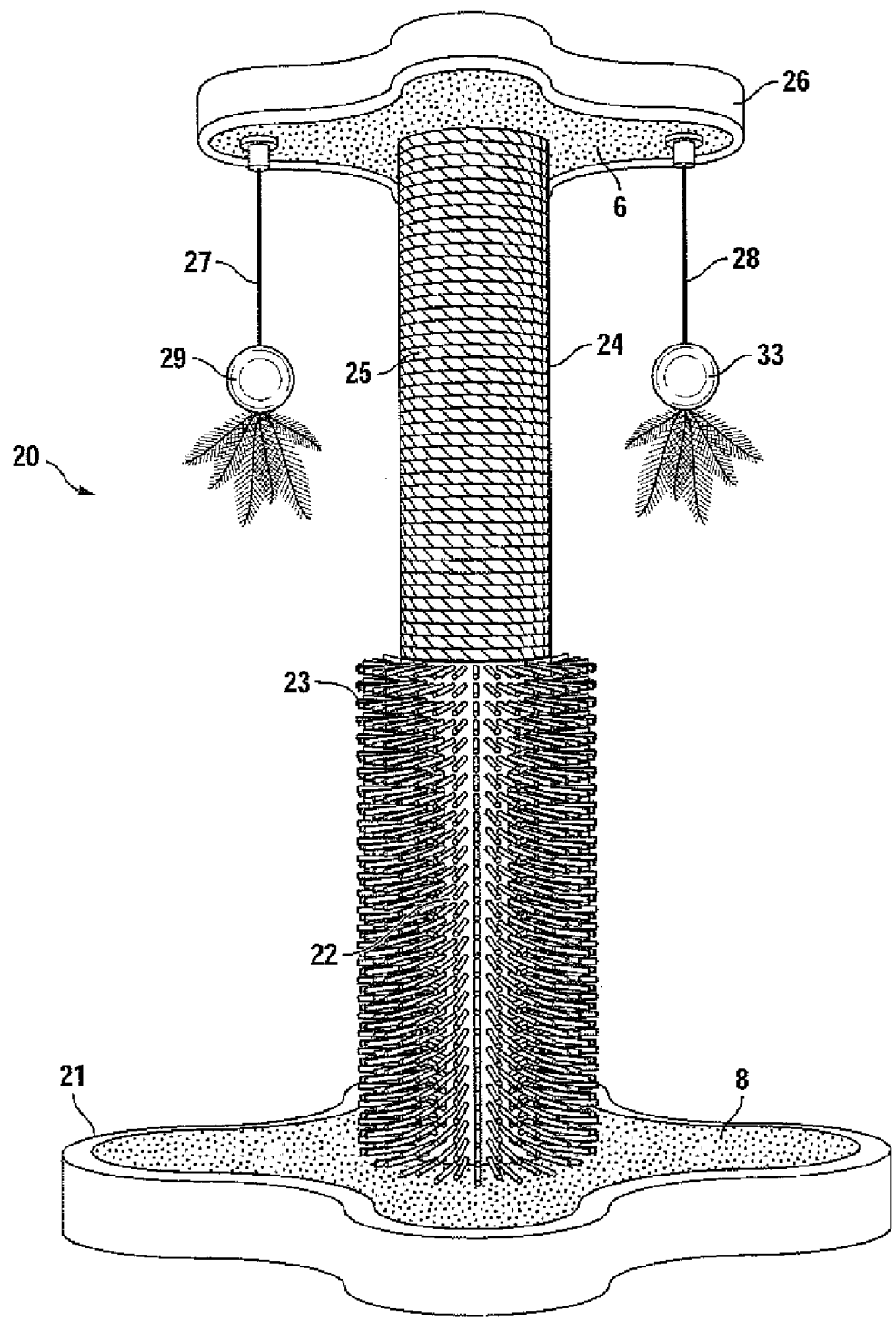
FIG. 2 is a perspective view of a second embodiment of the cat grooming and activity device of the present invention.

As a second embodiment to the present invention, reference is made to FIG. 2 showing cat grooming and activity device 20 in the form of base 21, grooming surface 22 from which nodules 23 emanate followed by scratching surface 24 composed of helically wound rope 25 terminating at top 26 as shown. Dangling from top 26 are umbilicals 27 and 28 having attractant toys 29 and 33, respectively. Use of cat grooming activity device 20 is similar to that of the corresponding device of FIG. 1. By placing top 26 and bottom 21 on opposite sides of the grooming activity post and by providing them with irregular perimeters which are similarly shaped but optionally of a different size, if device 20 was to be tipped over by an overly aggressive cat it would continue to function in its prone orientation. The irregular perimeters of top 26 and bottom 21 would prevent cat grooming and activity device 20 from rolling inadvertently and would thus keep the device in a stationary although prone orientation.

As a further embodiment, it is noted that base surfaces 6, 8, 11 and 31 can also be grooming surfaces. Surfaces 6, 8 and 11 are shown composed of directional microfiber, while surface 31 is batting or unwoven polyester fiber that can trap hair and dander that falls from the cat or from the vertically extending grooming posts.

The above disclosure is sufficient to enable one of ordinary skill in the art to practice the invention, and provides the best mode of practicing the invention presently contemplated by the inventor While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat grooming and activity device comprising a base configured to reside upon a substantially horizontal surface and to support a grooming activity post extending vertically therefrom, a grooming activity post appended to and extending from said base, said grooming activity post having a first segment proximate said base and a second segment extending from said first segment, said first segment comprising a grooming surface and said second segment comprising a scratching surface.

2. The cat grooming and activity device of claim 1 wherein said grooming surface comprises a plurality of pliable nodules capable of grooming a cat when said cat contacts said nodules during use of the present device.

3. The cat grooming and activity device of claim 2 wherein said second segment comprises a scratching surface selected from the group consisting of carpet, sisal, seagrass, cardboard and rope.

4. The cat grooming and activity device of claim 1 further comprising a top located upon said grooming activity post.

5. The cat grooming and activity device of claim 4 wherein said top and base are located on opposite ends of said grooming activity post.

6. The cat grooming and activity device of claim 5 further comprising cat attractants suspended from said top.

7. The cat grooming and activity device of claim 5 wherein said top and base have irregular perimeters that prevent said device from rolling on said support surface if tipped over.

8. The cat grooming and activity device of claim 1 wherein said base includes a grooming surface.

9. The cat grooming and activity device of claim 8 wherein said grooming surface of said base comprises a member selected from the group consisting of directional microfiber and unwoven polyester fiber.

* * * * *